(12) United States Patent
Lu et al.

(10) Patent No.: US 10,985,476 B2
(45) Date of Patent: Apr. 20, 2021

(54) CYLINDRICAL JOINT FOR CONNECTING SUB-CABLES OF SUPERCONDUCTING BUSBAR

(71) Applicant: HEFEI INSTITUTES OF PHYSICAL SCIENCE, CHINESE ACADEMY OF SCIENCES, Anhui (CN)

(72) Inventors: Kun Lu, Anhui (CN); Yuntao Song, Anhui (CN); Xiongyi Huang, Anhui (CN); Xinjie Wen, Anhui (CN); Chen Liu, Anhui (CN)

(73) Assignee: HEFEI INSTITUTES OF PHYSICAL SCIENCE, CHINESE ACAD, Hefei (CN)

( * ) Notice: Subject to any disclaimer, the term of this patent is extended or adjusted under 35 U.S.C. 154(b) by 0 days.

(21) Appl. No.: 17/027,692

(22) Filed: Sep. 21, 2020

(65) Prior Publication Data

US 2021/0083406 A1  Mar. 18, 2021

Related U.S. Application Data

(63) Continuation of application No. PCT/CN2019/097524, filed on Jul. 24, 2019.

(30) Foreign Application Priority Data

Jul. 27, 2018  (CN) .......................... 201810843776.8

(51) Int. Cl.
*H01R 4/68* (2006.01)
*H01R 43/02* (2006.01)

(52) U.S. Cl.
CPC .............. *H01R 4/68* (2013.01); *H01R 43/02* (2013.01)

(58) Field of Classification Search
CPC ................................. H01R 4/68; H01R 43/02
See application file for complete search history.

(56) References Cited

U.S. PATENT DOCUMENTS

| | | | | | |
|---|---|---|---|---|---|
| 4,965,246 | A | * | 10/1990 | Suzawa ................. | H01B 12/02 505/220 |
| 8,340,737 | B1 | * | 12/2012 | Arndt ..................... | H01F 6/065 505/220 |

FOREIGN PATENT DOCUMENTS

| | | | |
|---|---|---|---|
| CN | 102769214 | A | 11/2012 |
| CN | 102522277 | B * | 3/2014 |
| CN | 102545141 | B * | 9/2014 |
| CN | 104466882 | A | 3/2015 |
| CN | 104682024 | A | 6/2015 |
| CN | 106911014 | A | 6/2017 |

(Continued)

*Primary Examiner* — Carl J Arbes

(57) ABSTRACT

A cylindrical joint for connecting sub-cables of a superconducting busbar includes a stainless steel shell, stainless steel pressure plates, first sub-cables, second sub-cables, copper saddles, a stainless steel support, indium coatings, stainless steel tapers. First and second sub-cables are supported by the stainless steel support. The first sub-cables and the second sub-cables are embedded into the grooves on the stainless steel support in sequence. The copper saddles are embedded into each of the grooves, and the indium coating is plated on both sides of the copper saddle, respectively. The stainless steel pressure plate is welded to the stainless steel support. The outer side of the joint is the stainless steel shell. The cylindrical joint of the disclosure has a low resistance, a lower AC loss, less materials, and a good cooling performance.

2 Claims, 4 Drawing Sheets

(56) References Cited

FOREIGN PATENT DOCUMENTS

| | | |
|---|---|---|
| CN | 107104293 A | 8/2017 |
| CN | 109148074 A | 1/2019 |
| DE | 102012021332 A1 | 4/2014 |
| EP | 0 709 618 B1 * | 5/1996 |
| JP | 01175117 A * | 7/1989 |
| JP | 2016149248 A | 8/2016 |
| KR | 20100004281 A | 1/2010 |

* cited by examiner

CYLINDRICAL JOINT FOR CONNECTING SUB-CABLES OF SUPERCONDUCTING BUSBAR

CROSS-REFERENCE TO RELATED APPLICATIONS

This application is a continuation of International Application No. PCT/CN2019/097524, filed on Jul. 24, 2019, which claims the benefit of priority from Chinese Patent Application No. 201810843776.8, filed on Jul. 27, 2018. The content of the aforementioned applications, including any intervening amendments thereto, are incorporated herein by reference.

TECHNICAL FIELD

The present application relates to superconducting magnet devices, and more particularly to a cylindrical joint for connecting sub-cables of a superconducting busbar.

BACKGROUND OF THE DISCLOSURE

Feeder systems in Tokamak are used to supply supercritical helium and current for superconducting magnets. Busbars of each feeder in superconductors of the tokamak are used for electric conduction, and each busbar is divided into different segments which are connected through superconducting joints. However, existing superconducting joints are twin-box joints having a large resistance and a high alternating current (AC) loss. In addition, an external coolant duct is required, and a good cooling effect cannot be achieved. Besides, due to the quadrate shape of the twin-box joints, electrical insulations are difficult to achieve a uniform tension, and thus the improvement of the superconducting joint of Tokamak is necessary.

SUMMARY OF THE DISCLOSURE

An object of the disclosure is to provide a cylindrical joint for connecting sub-cables of a superconducting busbar to overcome the defects in the prior art.

The disclosure is achieved by the following technical solutions.

The disclosure provides a cylindrical joint for connecting sub-cables of a superconducting busbar, comprising: a stainless steel shell which is cylindrical; wherein two stainless steel tapers are respectively connected to two ends of the stainless steel shell; a stainless steel support is provided in the stainless steel shell; a through hole is provided at a center of the stainless steel support; a plurality of grooves spaced apart are provided circumferentially around the stainless steel support;

a first busbar and a second busbar extend into a middle of the stainless steel shell from the two stainless steel tapers at both ends of the stainless steel shell respectively; terminals of the first busbar and the second busbar are untwisted to obtain a bunch of first sub-cables, a bunch of second sub-cables and two copper cores;

the number of the grooves on the stainless steel support is the same as that of the first sub-cables and the second sub-cable; the two copper cores enter the stainless steel shell through the through hole of the stainless steel support, respectively, and are in compressed connection;

the first sub-cables and the second sub-cables are embedded into the grooves on the stainless steel support in sequence; and a copper saddle is placed into each of the grooves, an indium coating is plated on both sides of the copper saddle, respectively; a first sub-cable and a second sub-cable embedded in the same groove are in compressed connection with the both sides of the copper saddle, respectively; and a stainless steel pressure plate is embedded in each of the grooves of the stainless steel support.

In some embodiments, the first sub-cables, the copper saddle, the second sub-cables, and the first copper core and the second copper core are in compressed connection under a pressure of 100 t at room temperature.

In some embodiments, the stainless steel support is provided at a junction between each of the two stainless steel tapers and the stainless steel shell in a welded manner.

In some embodiments, the stainless steel pressure plate is configured to provide pressures for connections of the first sub-cables and the second sub-cables.

In some embodiments, the first sub-cables and the second sub-cables have a lapped length of 300 mm in the stainless steel shell.

Compared with the existing twin-box joints, the disclosure has the following beneficial effects.

The cylindrical joint in the disclosure has a smaller resistance and a lower AC loss.

The cylindrical joint has a lapped length of 300 mm, and the twin-box joint has a lapped length of 450 mm, so that more spaces and materials are saved in the present disclosure.

When the insulation layer is wrapped, the cylindrical joint of the disclosure provides the insulation with a more even tension than the twin-box joint.

The cylindrical superconducting joint has a better cooling performance, since the superfluid helium coolant flows through a space between the sub-cables and the copper cores without using external cooling ducts.

DETAILED DESCRIPTION OF EMBODIMENTS

Figure 1:
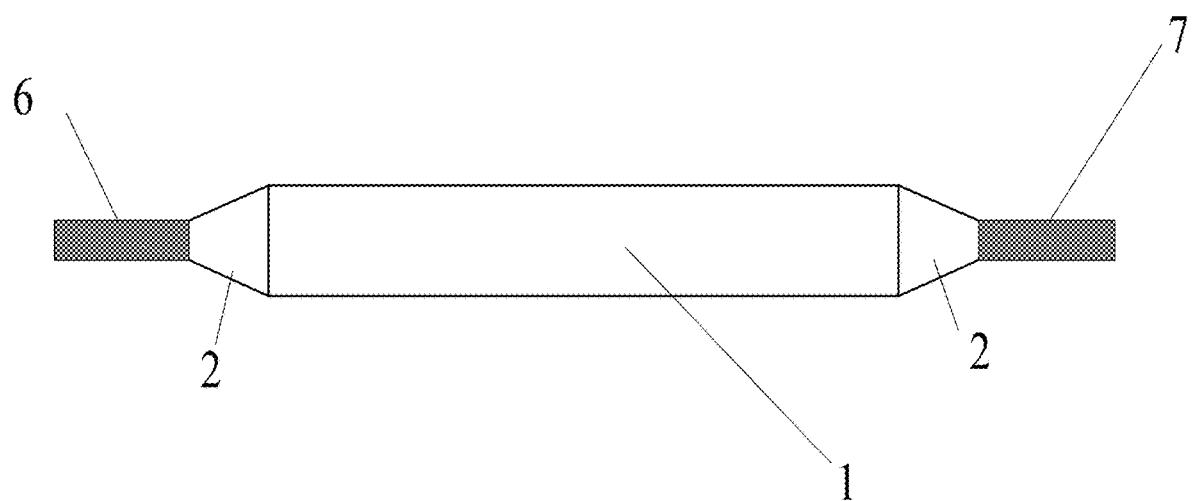
FIG. 1 schematically shows a cylindrical joint for connecting sub-cables of a superconducting busbar according to the present disclosure.
Figure 2:
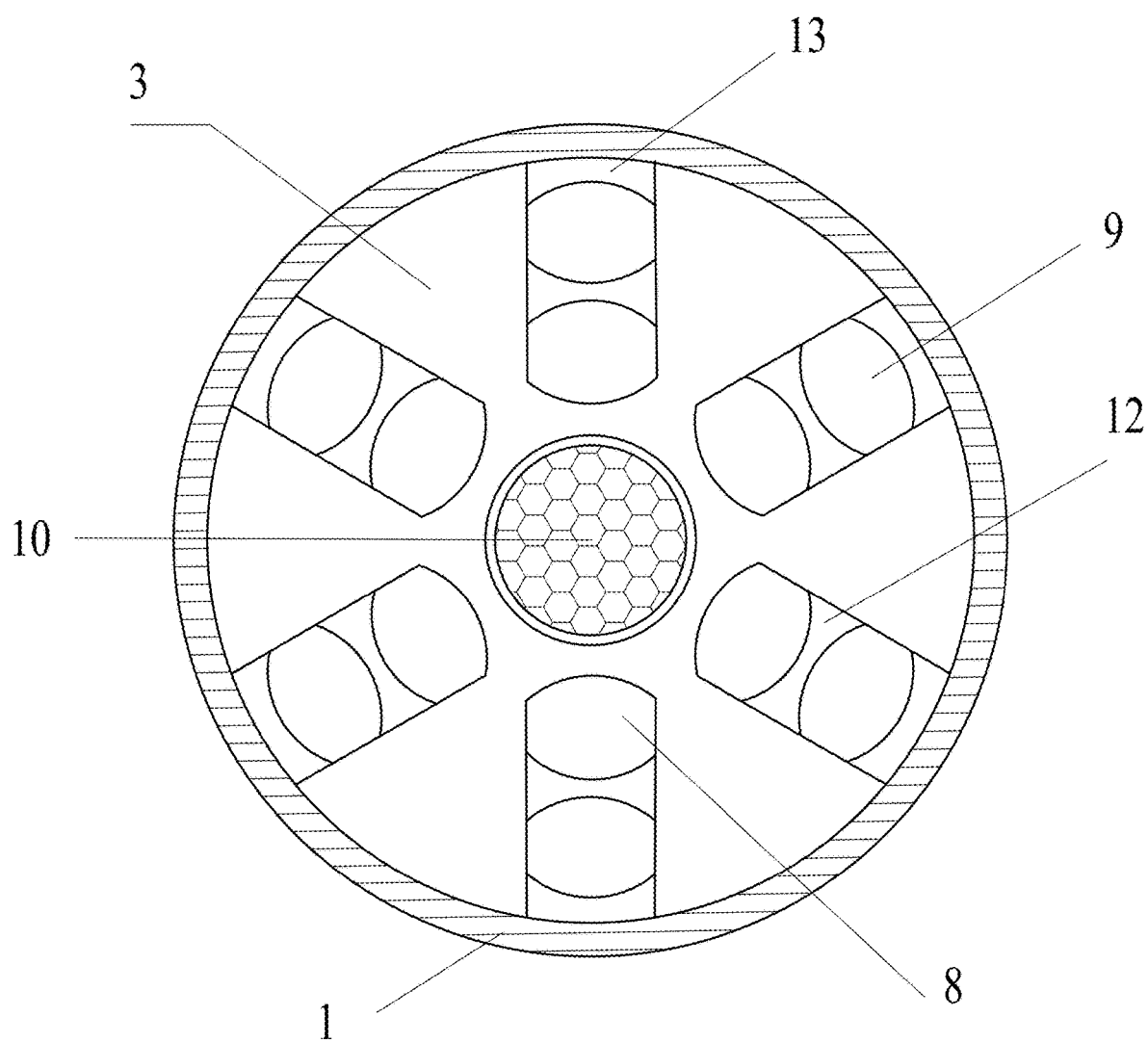
FIG. 2 is a sectional view of an inner part of a stainless steel support in the cylindrical joint according to the present disclosure.
Figure 3:
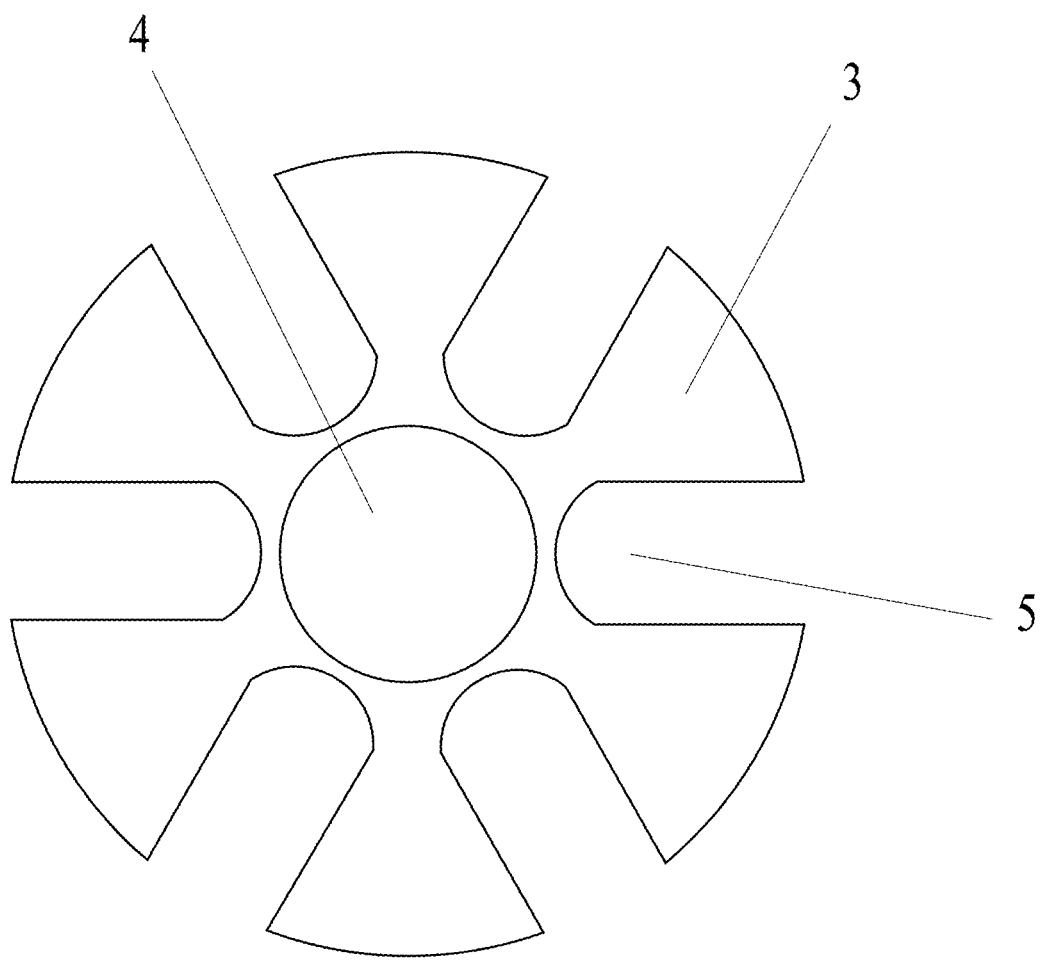
FIG. 3 is a schematic diagram of the stainless steel support in the cylindrical joint according to the present disclosure.
Figure 4:
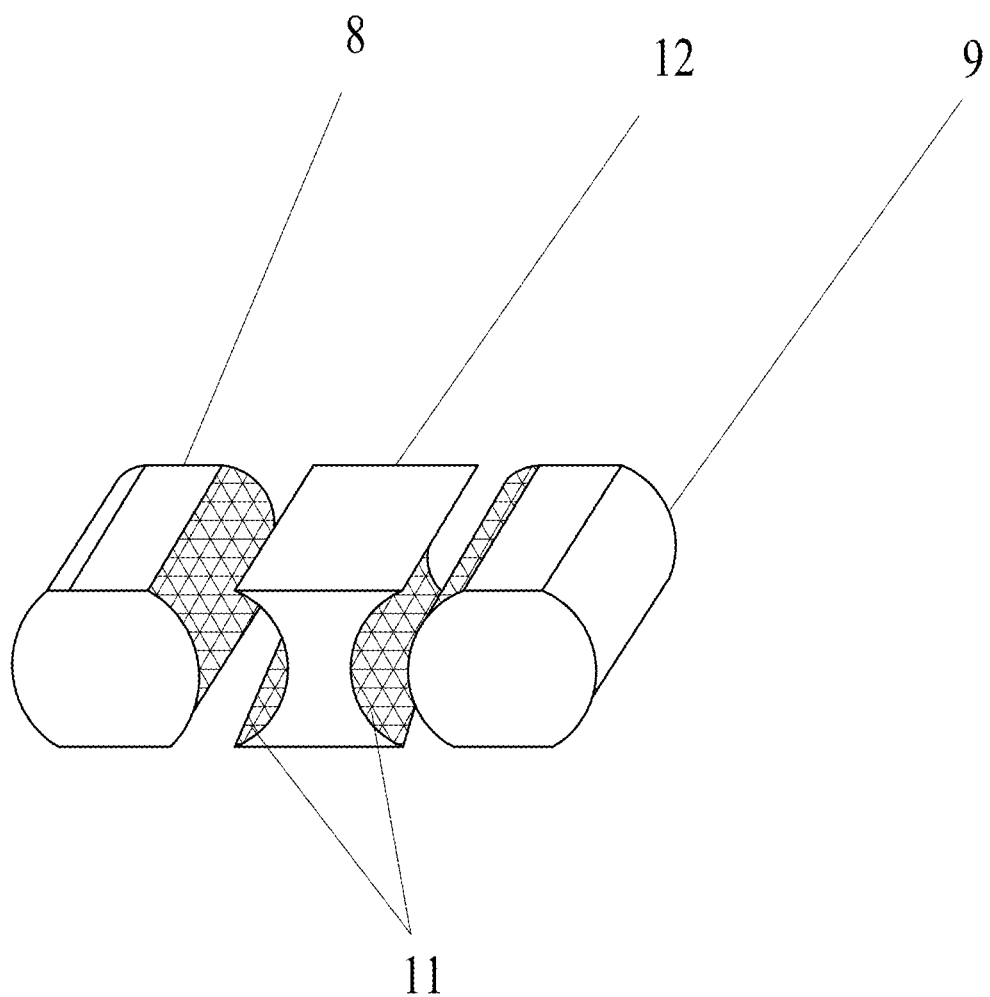
FIG. 4 schematically shows an arrangement of a first sub-cable, a copper saddle and a second sub-cable in the cylindrical joint according to the present disclosure.

As shown in FIGS. 1-4, the disclosure provides a cylindrical joint for connecting sub-cables of a superconducting busbar, including: a stainless steel shell 1 which is cylindrical. Two stainless steel tapers are respectively connected with two ends of the stainless steel shell 1; a stainless steel support 3 is provided in the stainless steel shell 1; a through hole 4 is provided at a center of the stainless steel support 3; a plurality of grooves 5 spaced apart are provided circumferentially around the stainless steel support 3.

A first busbar 6 and a second busbar 7 extend into a middle of the stainless steel shell 1 from the two stainless steel tapers at both ends of the stainless steel shell 1, respectively; terminals of the first busbar 6 and the second busbar 7 are untwisted to obtain a bunch of first sub-cables 8, a bunch of second sub-cables 9 and two copper cores 10.

The grooves 5 on the stainless steel support 3 have the same number as the first sub-cables 8 and the second sub-cables 9; the two copper cores 10 enter the stainless steel shell 1 through the through hole 4 of the stainless steel support 3, respectively, and are in compressed connection; the first sub-cables 8 and the second sub-cables 9 are embedded into the grooves 5 on the stainless steel support 3 in sequence.

A copper saddle 12 is placed into each of the grooves 5, and an indium coating 11 is plated on both sides of the copper saddle 12, respectively; a first sub-cable 8 and a second sub-cable 9 embedded in the same groove 5 are in compressed connection with the both sides of the copper saddle 12, respectively.

In some embodiments, the first sub-cables 8, the copper saddle 12 and the second sub-cables 9, and the two copper cores 10 are compressed under a pressure of 100 t at room temperature.

A stainless steel pressure plate 13 is embedded in each of the grooves 5 on the stainless steel support 3.

In some embodiments, the stainless steel support 3 is arranged at a junction between each of the two stainless steel tapers and the stainless steel shell 1 in a welded manner.

The cylindrical joint has a length of 400 mm. Nickle coating on external layers of the first sub-cables 8 and the second sub-cables 9 is removed by the reverse electroplating. After both sides of the copper saddle 12 are plated with the indium coating 11 having a thickness of approximate 0.2 mm, oxide on a surface of the indium coating 11 and an additional passage are removed to reduce the contact resistance between the first sub-cables 8 and the copper saddle 12, and the second sub-cables 9 and the copper saddle 12. Compared with the existing twin-box joints, the joint of the disclosure has a better cooling performance, since the super-fluid helium coolant flows through a space between the sub-cables and the copper cores without using external cooling ducts. In addition, the cylindrical superconducting joint of the disclosure provides the insulators with a more even tension than the twin-box joints.

What is claimed is:

1. A cylindrical joint for connecting sub-cables for a superconducting busbar, comprising: a stainless steel shell which is cylindrical;

wherein two stainless steel tapers are respectively connected with two ends of the stainless steel shell; a stainless steel support are respectively provided in the stainless steel shell; a through hole is provided at a center of the stainless steel support; a plurality of grooves spaced apart are provided circumferentially around the stainless steel support;

a first busbar and a second busbar extend into a middle of the stainless steel shell from the two stainless steel tapers at both ends of the stainless steel shell respectively; terminals of the first busbar and the second busbar are untwisted to obtain a bunch of first sub-cables, a bunch of second sub-cables and two copper cores;

the grooves on the stainless steel support have the same number with the first sub-cables and the second sub-cables; the two copper cores enter the stainless steel shell through the through hole of each of the stainless steel support, respectively, and are in compressed connection; the first sub-cables and the second sub-cables are embedded into the grooves on the stainless steel support in sequence; and a copper saddle is placed into each of the grooves, and an indium coating is plated on both sides of the copper saddle, respectively; a first sub-cable and a second sub-cable embedded in the same groove are in compressed connection with the both sides of the copper saddles, respectively; and a stainless steel pressure plate is embedded in each of the grooves of the stainless steel support.

2. The cylindrical superconducting joint of claim 1, wherein the stainless steel support is provided at a junction between each of the two stainless steel tapers and the stainless steel shell in a welded manner.

* * * * *